United States Patent
Inokuchi et al.

(10) Patent No.: US 8,299,182 B2
(45) Date of Patent: *Oct. 30, 2012

(54) ACRYLIC PRESSURE-SENSITIVE ADHESIVE COMPOSITION AND ACRYLIC PRESSURE-SENSITIVE ADHESIVE TAPE

(75) Inventors: Shinji Inokuchi, Ibaraki (JP); Tetsuya Hirose, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/085,132

(22) Filed: Apr. 12, 2011

(65) Prior Publication Data

US 2011/0251351 A1    Oct. 13, 2011

(30) Foreign Application Priority Data

Apr. 13, 2010  (JP) ................................ 2010-092640
Apr. 11, 2011  (JP) ................................ 2011-087356

(51) Int. Cl.
*C08F 8/00* (2006.01)
*C08L 33/02* (2006.01)
*C08L 33/04* (2006.01)
*C08L 35/02* (2006.01)

(52) U.S. Cl. ......... 525/192; 525/194; 525/221; 525/222

(58) Field of Classification Search ................... 525/192, 525/194, 221, 222
See application file for complete search history.

(56) References Cited

U.S. PATENT DOCUMENTS

| | | | |
|---|---|---|---|
| 4,223,067 A | 9/1980 | Levens | |
| 5,700,585 A * | 12/1997 | Lee | ............... 428/500 |
| 2004/0000370 A1 | 1/2004 | Kiuchi et al. | |
| 2008/0278672 A1 | 11/2008 | Yano et al. | |
| 2009/0233093 A1 | 9/2009 | Toyama et al. | |
| 2011/0250433 A1 * | 10/2011 | Inokuchi et al. | ........... 428/317.3 |

FOREIGN PATENT DOCUMENTS

| | | |
|---|---|---|
| EP | 1 151 853 A1 | 11/2001 |
| JP | 57-17030 B2 | 4/1982 |
| JP | 06-346026 | 12/1994 |
| JP | 07-048549 A | 2/1995 |
| JP | 2001-049200 | 2/2001 |
| JP | 2001-212900 A | 8/2001 |
| JP | 2002-003800 A | 1/2002 |
| JP | 2002-088320 A | 3/2002 |
| JP | 2002-121505 A | 4/2002 |
| JP | 2004-018761 A | 1/2004 |
| JP | 2004-069975 | 3/2004 |
| JP | 2006-045474 | 2/2006 |
| JP | 2009-258570 A | 11/2009 |

OTHER PUBLICATIONS

European Search Report dated Jun. 30, 2011, issued in Application No. 11162187.6.
Japanese Office Action issued in Application No. 2011-087356 dated May 29, 2012.
Japanese Office Action issued in Application No. 2011-087356 dated Aug. 28, 2012.

* cited by examiner

*Primary Examiner* — Nathan M Nutter
(74) *Attorney, Agent, or Firm* — Sughrue Mion, PLLC

(57) ABSTRACT

A single-layered acrylic pressure-sensitive adhesive tape having a pressure-sensitive adhesive layer formed of an acrylic pressure-sensitive composition. The acrylic pressure-sensitive adhesive composition contains an acrylic polymer (A) and a (meth)acrylic polymer (B) having glass transition temperature (Tg) such that Tg≦45° C. and a mass average molecular weight (Mw) is such that 1500≦Mw≦4000.

4 Claims, No Drawings

ACRYLIC PRESSURE-SENSITIVE ADHESIVE COMPOSITION AND ACRYLIC PRESSURE-SENSITIVE ADHESIVE TAPE

BACKGROUND OF THE INVENTION

1. Field of the Invention

The present invention relates to an acrylic pressure-sensitive adhesive composition and an acrylic pressure-sensitive adhesive tape.

2. Description of Related Art

Conventionally, acrylic pressure-sensitive adhesive tapes having an acrylic pressure-sensitive adhesive layer have been widely used because they are excellent in light resistance, weather resistance, and oil resistance, etc., and also excellent in adhesive properties, such as adhesive force and cohesive force, etc, and aging resistance, such as heat resistance and weather resistance, etc. In particular, the acrylic pressure-sensitive adhesive tapes are applied not only to adherends having high polarity, such as glass and stainless steel, etc., that have been widely used for the materials in home electronic appliances, automobiles, and building materials, but also to adherends having low polarity, such as polystyrene, ABS (acrylonitrile butadiene styrene copolymer resin), and polycarbonate, etc, (see Japanese Patent Publication No. S57-17030 (U.S. Pat. No. 4,223,067), Japanese Patent Application Publications Nos. 1995-48549, 2001-212900, 2002-088320, 2002-003800, 2002-121505, and 2004-018761).

In conventional acrylic pressure-sensitive adhesive tapes, because the adhesiveness to the adherends having low polarity (in particular, ABS) at a low temperature (more specifically at 5° C.) is not sufficient, there is a challenge that the temperature range at which the acrylic pressure-sensitive adhesive tapes can be used is restricted. Accordingly, there has been a demand to improve the adhesiveness to adherends having low polarity at a low temperature.

SUMMARY OF THE INVENTION

The present invention has been made in view of such challenge, and a purpose of the invention is to provide an acrylic pressure-sensitive adhesive composition or an acrylic pressure-sensitive adhesive tape in which the adhesiveness to an adherend having low polarity at a low temperature is improved.

An embodiment of the present invention is an acrylic pressure-sensitive adhesive composition. The acrylic pressure-sensitive adhesive composition comprises an acrylic polymer (A) and a (meth)acrylic polymer (B) having glass transition temperature (Tg) such that $Tg \leq 45°$ C. and a mass average molecular weight (Mw) such that $1500 \leq Mw \leq 4000$.

According to the acrylic pressure-sensitive adhesive composition of the aforementioned embodiment, the adhesiveness to an adherend having low polarity at a low temperature is improved.

The pressure-sensitive adhesive composition of the aforementioned embodiment may contain a carboxyl group-containing thiol as a chain transfer agent such that the degree of polymerization of the (meth)acrylic polymer (B) is adjusted by the chain transfer agent.

Another embodiment of the present invention is an acrylic pressure-sensitive adhesive tape. The acrylic pressure-sensitive adhesive tape contains the acrylic pressure-sensitive adhesive composition according to either of the aforementioned embodiments.

DETAILED DESCRIPTION OF THE INVENTION

The present invention will now be described by reference to the preferred embodiments. This does not intend to limit the scope of the present invention, but to exemplify the invention.

Hereinafter, embodiments of the present invention will be described.

Embodiment

An embodiment of the present invention is an acrylic pressure-sensitive adhesive tape containing a pressure-sensitive adhesive tape of a single layer having a pressure-sensitive adhesive layer formed of an acrylic pressure-sensitive adhesive composition.

The acrylic pressure-sensitive adhesive composition comprises an acrylic polymer (A) and a (meth)acrylic polymer (B) as major components. Hereinafter, each component of the acrylic pressure-sensitive adhesive composition will be described in detail.

[Acrylic Polymer (A)]

The acrylic polymer (A) contains, as a monomer unit, 50% by mass or more of (meth)acrylic acid alkyl ester having a linear or branched-chain $C_{1-20}$ alkyl group. In the acrylic polymer (A), the (meth)acrylic acid alkyl ester having $C_{1-20}$ alkyl group may be used alone or in combination of two or more thereof. The acrylic polymer (A) can be obtained by polymerizing (for example, solution polymerization, emulsion polymerization, or UV polymerization) the (meth)acrylic acid alkyl ester along with a polymerization initiator.

The ratio of the (meth)acrylic acid alkyl ester having a $C_{1-20}$ alkyl group is within a range of 50% by mass or more to 99.9% by mass or less, preferably within a range of 60% by mass or more to 95% by mass or less, and more preferably within a range of 70% by mass or more to 93% by mass or less, based on the total mass of the monomer components for preparing the acrylic polymer (A).

Examples of the (meth)acrylic acid alkyl ester having a $C_{1-20}$ alkyl group include, for example: (meth)acrylic acid $C_{1-20}$ alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid nonadecyl, and (meth)acrylic acid eicosyl, etc.; preferably (meth)acrylic acid $C_{2-14}$ alkyl esters; and more preferably (meth)acrylic acid $C_{2-10}$ alkyl esters, etc. Herein, the "(meth)acrylic acid alkyl ester" means an acrylic acid alkyl ester and/or a methacrylic acid alkyl ester, and all of the "(meth)." expressions have the same meaning.

Examples of the (meth)acrylic acid ester other than the (meth)acrylic acid alkyl ester include, for example: (meth)acrylic acid esters having a alicyclic hydrocarbon group, such as cyclopentyl(meth)acrylate, cyclohexyl(meth)acrylate, and isobornyl(meth)acrylate, etc.; (meth)acrylic acid esters having an aromatic hydrocarbon group, such as phenyl(meth)

acrylate, etc.; and (meth)acrylic acid esters obtained from an alcohol derived from a terpene compound, etc.

For the purpose of modifying cohesive force, heat resistance, and cross-linking property, the acrylic polymer (A) may contain, if necessary, another monomer component (co-polymerizable monomer) that is copolymerizable with the (meth)acrylic acid alkyl ester. Accordingly, the acrylic polymer (A) may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylic acid, methacrylic acid, carboxy ethyl acrylate, carboxy pentylacrylate, itaconic acid, maleic acid, fumaric acid, crotonic acid, and isocrotonic acid, etc.; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate, etc.; acid anhydride group-containing monomers, such as maleic acid anhydride, and itaconic acid anhydride, etc.; sulfonic acid group-containing monomers, such as styrene sulfonic acid, allyl sulfonic acid, 2-(meth)acrylamide-2-methylpropanesulfonic acid, (meth)acrylamide propanesulfonic acid, sulfopropyl(meth)acrylate, and (meth)acryloyloxy naphthalene sulfonic acid, etc.; phosphate group-containing monomers, such as 2-hydroxyethyl acryloyl phosphate, etc.; (N-substituted) amide monomers, such as (meth)acrylamide, N,N-dimethyl(meth)acrylamide, N,N-diethyl(meth)acrylamide, N-isopropyl(meth)acrylamide, N-butyl(meth)acrylamide, N-methylol (meth)acrylamide, N-methylol propane (meth)acrylamide, N-methoxymethyl(meth)acrylamide, and N-butoxymethyl(meth)acrylamide, etc.; succinimide monomers, such as N-(meth)acryloyloxy methylene succinimide, N-(meth)acryloyl-6-oxy hexamethylene succinimide, and N-(meth)acryloyl-8-oxy hexamethylene succinimide, etc.; maleimide monomers, such as N-cyclohexyl maleimide, N-isopropylmaleimide, N-lauryl maleimide, and N-phenyl maleimide, etc.; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide, etc.; vinyl esters, such as vinyl acetate and vinyl propionate, etc.; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, and N-vinyl morpholine, etc.; N-vinyl carboxylic acid amides; lactam monomers, such as N-vinyl caprolactam, etc.; cyanoacrylate monomers, such as acrylonitrile and methacrylonitrile, etc.; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl, etc.; (meth)acrylic acid alkoxy alkyl monomers, such as (meth)acrylic acid methoxyethyl, and (meth)acrylic acid ethoxyethyl, etc.; styrene monomers, such as styrene and α-methylstyrene, etc.; epoxy group-containing acrylic monomers, such as (meth)acrylic acid glycidyl, etc.; glycol acrylic ester monomers, such as (meth)acrylic acid polyethylene glycol, (meth)acrylic acid polypropylene glycol, (meth)acrylic acid methoxy ethylene glycol, and (meth)acrylic acid methoxy polypropylene glycol, etc.; acrylic acid ester monomers having a heterocycle, halogen atom, silicon atom, or the like, such as (meth)acrylic acid tetrahydrofurfuryl, fluoride(meth)acrylate, and silicone(meth)acrylate, etc.; olefin monomers, such as isoprene, butadiene, and isobutylene, etc.; vinyl ether monomers, such as methyl vinyl ether, and ethyl vinyl ether, etc.; thioglycolic acid; vinyl esters, such as vinyl acetate, and vinyl propionate, etc.; aromatic vinyl compounds such as styrene, and vinyl toluene, etc.; olefins or dienes, such as ethylene, butadiene, isoprene, and isobutylene, etc.; vinyl ethers, such as vinyl alkyl ether, etc.; vinyl chloride; (meth)acrylic acid alkoxy alkyl monomers, such as (meth)acrylic acid methoxyethyl and (meth)acrylic acid ethoxyethyl, etc.; sulfonic acid group-containing monomers such as vinyl sulfonate sodium, etc.; imide group-containing monomers, such as cyclohexyl maleimide and isopropyl maleimide, etc.; isocyanate group-containing monomers, such as 2-isocyanate ethyl(meth)acrylate, etc.; fluorine atom-containing (meth)acrylates; and silicon atom-containing (meth)acrylates, etc. These copolymerizable monomers can be used alone or in combination of two or more thereof.

When the acrylic polymer (A) contains a copolymerizable monomer along with the (meth)acrylic acid alkyl ester as a major component, carboxyl group-containing monomers are preferably used. Among them, an acrylic acid is preferably used. The amount of the copolymerizable monomer is not particularly limited, but the copolymerizable monomer can usually be contained in an amount within a range of 0.1 to 30% by mass, preferably in an amount within a range of 0.5 to 20% by mass, and more preferably in an amount within a range of 1 to 15% by mass, based on the total mass of the monomer components for preparing the acrylic polymer (A).

By containing the copolymerizable monomer in an amount of 0.1% by mass or more, decrease in the cohesive force of the acrylic pressure-sensitive adhesive tape can be prevented and high shear force can be obtained. Further, by making the content of the copolymerizable monomer to be 30% by mass or less, the cohesive force can be prevented from becoming too high and the tackiness at a normal temperature (25° C.) and further at a low temperature (5° C.) can be improved.

A polyfunctional monomer may be contained, if necessary, in the acrylic polymer (A) in order to adjust the cohesive force of the pressure-sensitive adhesive layer to be formed.

Examples of the polyfunctional polymer include, for example: (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth)acrylate, 1,12-dodecane diol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyl di(meth)acrylate, and hexyl di(meth)acrylate, etc. Among them, trimethylolpropane tri(meth)acrylate, hexanediol di(meth)acrylate, and dipentaerythritol hexa(meth)acrylate can be preferably used. The polyfunctional (meth)acrylates can be used alone or in combination of two or more thereof.

The amount of the polyfunctional monomer depends on the molecular weight or the number of functional groups thereof, but the polyfunctional monomer is added in an amount within a range of 0.01 to 3.0% by mass, preferably in an amount within a range of 0.02 to 2.0% by mass, and more preferably in an amount within a range of 0.03 to 1.5% by mass, based on the total mass of the monomer components for preparing the acrylic polymer (A).

If the amount of the polyfunctional monomer exceeds 3.0% by mass based on the total mass of the monomer components for preparing the acrylic polymer (A), for example, the cohesive force of the pressure-sensitive adhesive layer may become too high and accordingly there are sometimes cases where the adhesive force decreases. On the other hand, when the amount thereof is below 0.01% by mass, for example, there are sometimes cases where the cohesive force of the pressure-sensitive adhesive layer decreases.

<Polymerization Initiator>

In preparing the acrylic polymer (A), the acrylic polymer (A) can be easily formed by a curing reaction using heat or ultraviolet rays with the use of a polymerization initiator, such as a thermal polymerization initiator, a photo-polymerization initiator (photo-initiator), or the like. In particular, a photo-polymerization initiator can be preferably used in terms of the advantage that the polymerization time can be shortened. The polymerization initiators can be used alone or in combination of two or more thereof.

Examples of the thermal polymerization initiator include, for example: azo polymerization initiators [for example, 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobis isovaleronitrile, 2,2'-azobis(2-amidinopropane)dihydrochloride, 2,2'-azobis[2-(5-methyl-2-imidazoline-2-yl) propane]dihydrochloride, 2,2'-azobis(2-methylpropionamidine)disulfate, and 2,2'-azobis (N,N'-dimethyleneisobutylamidine)dihydrochloride, etc.]; peroxide polymerization initiators (for example, dibenzoyl peroxide, t-butyl permaleate, and lauroyl peroxide, etc.); and redox polymerization initiator, etc.

The use amount of the thermal polymerization initiator is not particularly limited, and only has to be within a conventional range in which it can be used as a thermal polymerization initiator.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specific examples of the benzoin ether photo-polymerization initiator include, for example: benzoin methyl ether, benzoin ethyl ether, benzoin propyl ether, benzoin isopropyl ether, benzoin isobutyl ether, 2,2-dimethoxy-1,2-diphenylethane-1-one [made by BASF, product name: IRGACURE 651], and anisole methyl ether, etc. Specific examples of the acetophenone photo-polymerization initiator include, for example: 1-hydroxycyclohexyl phenyl ketone [made by BASF, product name: IRGACURE 184], 4-phenoxy dichloroacetophenone, 4-t-butyl-dichloroacetophenone, 1-[4-(2-hydroxyethoxy)-phenyl]-2-hydroxy-2-methyl-1-propane-1-one [made by BASF, product name: IRGACURE 2959], 2-hydroxy-2-methyl-1-phenyl-propane-1-one [made by BASF, product name: DAROCUR 1173], and methoxy acetophenone, etc. Specific examples of the α-ketol photo-polymerization initiator include, for example: 2-methyl-2-hydroxy propiophenone and 1-[4-(2-hydroxyethyl)-phenyl]-2-hydroxy-2-methylpropane-1-one, etc. Specific examples of the aromatic sulfonyl chloride photo-polymerization initiator include, for example, 2-naphthalene sulfonyl chloride, etc. Specific examples of the photoactive oxime photo-polymerization initiator include, for example, 1-phenyl-1,1-propanedione-2-(o-ethoxycarbonyl)-oxime, etc.

Specific examples of the benzoin photo-polymerization initiator include, for example, benzoin, etc. Specific examples of the benzyl photo-polymerization initiator include, for example, benzyl, etc. Specific examples of the benzophenone photo-polymerization initiators include, for example, benzophenone, benzoylbenzoic acid, 3,3'-dimethyl-4-methoxybenzophenone, polyvinyl benzophenone, and α-hydroxy cyclohexyl phenyl ketone, etc. Specific examples of the ketal photo-polymerization initiator include, for example, benzyl dimethyl ketal, etc. Specific examples of the thioxanthone photo-polymerization initiator include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, and dodecyl thioxanthone, etc.

Examples of the acylphosphine photo-polymerization initiator include, for example: bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl) phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl) phosphine oxide, bis(2,4-dimethoxybenzoyl)(2-methypropane-1-yl) phosphine oxide, bis(2,4,6-trimethylbenzoyl)(2,4-dipentoxyphenyl) phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide, etc.

Among them, bis(2,4,6-trimethylbenzoyl)phenylphosphine oxide [made by BASF, product name: IRGACURE 819], bis(2,4,6-trimethylbenzoyl)-2,4-di-n-butoxyphenylphosphine oxide, 2,4,6-trimethylbenzoyl diphenylphosphine oxide [made by BASF, product name: Lucirin TPO], and bis(2,6-dimethoxybenzoyl)-2,4,4-trimethylpentylphosphine oxide, are preferred The amount of the photo-polymerization initiator is not particularly limited, but the photo-polymerization initiator is combined in an amount, for example, within a range of 0.01 to 5 parts by mass, preferably in an amount within a range of 0.05 to 3 parts by mass, and more preferably in an amount within a range of 0.05 to 2 parts by mass, based on 100 parts by mass of the monomer components for preparing the acrylic polymer (A).

If the amount of the photo-polymerization initiator is below 0.01 parts by mass, there are sometimes cases where the polymerization reaction is insufficient. If the amount thereof exceeds 5 parts by mass, there is fear that, because the photo-polymerization initiator absorbs an ultraviolet ray, the ultraviolet ray may not reach the inside of the pressure-sensitive adhesive layer, thereby causing a decrease in the polymerization ratio. With the molecular weight of the polymer becoming small, the cohesive force of the pressure-sensitive adhesive layer to be formed becomes low, and hence there are sometimes cases where part of the pressure-sensitive adhesive layer may remain on an adherend while the layer is being peeled off from the adherend. The photo-polymerization initiators may be used alone or in combination of two or more thereof.

Besides the aforementioned polyfunctional monomers, a cross-linking agent can also be used for adjusting the cohesive force. Commonly-used cross-linking agents can be used as the cross-linking agent. Examples of the cross-linking agents include, for example: epoxy cross-linking agent, isocyanate cross-linking agent, silicone cross-linking agent, oxazoline cross-linking agent, aziridine cross-linking agent, silane cross-linking gent, alkyl-etherified melamine cross-linking agent, and metal chelate cross-linking agent, etc. Among them, the isocyanate cross-linking agent and epoxy cross-linking agent can be preferably used.

Specific examples of the isocyanate cross-linking agent include: tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, polymethylene polyphenyl isocyanate, and these adducts with polyols, such as trimethylolpropane, etc.

Examples of the epoxy cross-linking agent include: bisphenol A, epichlorohydrin type epoxy resin, ethylenegly-cidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, and 1,3-bis(N,N'-diamine glycidyl aminomethyl)cyclohexane, etc.

In the present embodiment, the acrylic polymer (A) can also be prepared as a partial polymer (acrylic polymer syrup) that can be obtained by radiating a mixture in which the aforementioned monomer components and the polymerization initiator have been combined with ultraviolet (UV) rays onto, so that part of the monomer is polymerized. The polymerization can also be completed by preparing an acrylic pressure-sensitive adhesive composition that has been made by combining the later-described component (B) into the acrylic polymer syrup, then by coating the acrylic pressure-sensitive adhesive composition, and then irradiating with UV rays. The mass average molecular weight (Mw) of the acrylic polymer (A) is within a range of 100000 to 5000000.

[(Meth)Acrylic Polymer (B)]

The (meth)acrylic polymer (B) functions as a tackifier resin and has the advantage that the inhibition of polymerization hardly occurs when UV polymerization is performed after adding the (meth)acrylic polymer (B) into the acrylic polymer (A) (acrylic polymer syrup). The mass average molecular weight (Mw) of the (meth)acrylic polymer (B) is such that $1500 \leq Mw \leq 4000$, preferably such that $2000 \leq Mw \leq 3800$, and more preferably such that $2500 \leq Mw \leq 3700$; and the glass transition temperature (Tg) thereof is such that $Tg \leq 45°$ C., preferably such that $0°$ C. $\leq Tg \leq 45°$ C., and more preferably such that $15°$ C. $\leq Tg \leq 45°$ C. If the mass average molecular weight of the (meth)acrylic polymer (B) exceeds 4000, the adhesiveness to an adherend having low polarity at a low temperature decreases. On the other hand, when the mass average molecular weight thereof is below 1000, the mass average molecular weight is too low. Accordingly, there are sometimes cases where the adhesive performance and holding performance of the pressure-sensitive adhesive tape are decreased. In addition, if the glass transition temperature (Tg) of the (meth) acrylic polymer (B) exceeds 45° C., the adhesiveness to an adherend having low polarity at a low temperature decreases.

The mass average molecular weight of the (meth)acrylic polymer (B) can be measured by polystyrene conversion by the GPC method. Specifically, the mass average molecular weight can be measured using the HPLC 8020 made by TOSOH CORPORATION and two TSKgelGMH-H (20) columns and at a flow rate of 0.5 ml/min using tetrahydrofuran solvent.

The addition amount of the (meth)acrylic polymer (B) is preferably within a range of 5 to 45 parts by mass, and more preferably within a range of 10 to 30 parts by mass, based on 100 parts by mass of the acrylic polymer (A). If the (meth) acrylic polymer (B) is added in an amount more than 45 parts by mass, the elastic modulus of the pressure-sensitive adhesive layer becomes high, and accordingly there are sometimes cases where the adhesive performance at a low temperature becomes poor or adhesiveness may not be demonstrated even at a normal temperature. On the other hand, if the addition amount thereof is below 5 parts by mass, there are sometimes cases where the effects of the (meth)acrylic polymer (B) may not be obtained.

In the present embodiment, the glass transition temperature of the (meth)acrylic polymer (B) is defined as a glass transition temperature determined by DSC (Differential Scanning calorimetry). Specifically, the glass transition temperature can be determined by using the DSC-50 made by Shimadzu Corporation as follows: (1) five mg of the (meth) acrylic polymer (B) is weighed and put into a cell made of aluminum such that a sample to be measured is prepared; (2) the prepared sample is set up in the aforementioned apparatus and once heated to 200° C. at a rate of temperature increase of 10° C./min under $N_2$ atmosphere ($N_2$ flow rate of 40 mL/min), thereafter the sample is taken out to be left standing to cool (to be cooled rapidly); (3) subsequently, after the aforementioned apparatus is cooled to room temperature, the above sample is set up again to be cooled to −40° C. and is measured after heated to 200° C. again in the same way as the above (2); and (4) the endotherm onset temperature occurring at the time is assumed to be the glass transition temperature.

<Method of Producing (Meth)Acrylic Polymer (B)>

The (meth)acrylic polymer (B) can be produced by, for example, polymerizing a (meth)acrylic acid ester according to a solution polymerization method, a bulk polymerization method, an emulsion polymerization method, a suspension polymerization method, a mass polymerization method, or the like.

Examples of the (meth)acrylic acid ester include (meth) acrylic acid alkyl esters, such as (meth)acrylic acid methyl, (meth)acrylic acid ethyl, (meth)acrylic acid propyl, (meth) acrylic acid butyl, (meth)acrylic acid isobutyl, (meth)acrylic acid pentyl, (meth)acrylic acid hexyl, (meth)acrylic acid-2-ethylhexyl, (meth)acrylic acid octyl, (meth)acrylic acid nonyl, (meth)acrylic acid decyl, and (meth)acrylic acid dodecyl; esters of (meth)acrylic acids with alicyclic alcohols, such as cyclohexyl(meth)acrylate and (meth)acrylic acid isobornyl; and (meth)acrylic acid aryl esters, such as (meth) acrylic acid phenyl and (meth)acrylic acid benzyl. These (meth)acrylic acid esters can be used alone or in combination of them.

Cyclohexyl methacrylate can be preferably used as a monomer unit that forms the (meth)acrylic polymer (B).

Other than the above component unit of (meth)acrylic acid ester, the (meth)acrylic polymer (B) can also be obtained by copolymerizing a monomer having a polymerizable unsaturated bond that is copolymerizable with (meth)acrylic acid ester.

Examples of the monomer having a polymerizable unsaturated bond that is copolymerizable with (meth)acrylic acid ester include: (meth)acrylic acid alkoxyalkyls, such as (meth) acrylic acid, (meth)acrylic acid methoxyethyl, (meth)acrylic acid ethoxyethyl, (meth)acrylic acid propoxyethyl, (meth) acrylic acid butoxyethyl, and (meth)acrylic acid ethoxypropyl; salts, such as (meth)acrylic acid alkali metal salt, etc.; di(meth)acrylic acid esters of (poly)alkylene glycols, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth) acrylic acid ester of tripropylene glycol; poly(meth)acrylic acid esters, such as trimethylolpropane tri(meth)acrylic acid ester; (meth)acrylonitrile; vinyl acetate; vinylidene chloride; halogenated vinyl compounds, such as (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth) acryloylaziridine, (meth)acrylic acid-2-aziridinylethyl; epoxy group-containing vinyl monomers, such as allyl glycidyl ether, (meth)acrylic acid glycidyl ether and (meth) acrylic acid-2-ethyl glycidyl ether; hydroxyl group-containing vinyl monomers, such as (meth)acrylic acid-2-hydroxyethyl, (meth)acrylicacid-2-hydroxypropyl, monoesters of (meth)acrylic acids with polypropylene glycol or polyethylene glycol, and adducts of lactones with (meth) acrylic acid-2-hydroxyethyl; fluorine-containing vinyl monomers, such as fluorine-substituted (meth)acrylic acid alkyl ester; unsaturated carboxylic acids including itaconic acid, crotonic acid, maleic acid, and fumaric acid, salts thereof, (partial)ester compounds thereof, and acid anhydrides thereof; reactive halogen-containing vinyl monomers, such as 2-chloroethyl vinyl ether and monochloro vinyl acetate; amide group-containing vinyl monomers, such as methacrylamide, N-methylol methacrylamide, N-methoxyethyl methacrylamide, N-butoxymethyl methacrylamide, and N-acryloyl morpholine; organic silicon-containing vinyl monomers, such as vinyltrimethoxysilane, γ-methacryloxypropyl trimethoxy silane, allyltrimethoxysilane, trimethoxysilylpropylallylamine, and 2-methoxy ethoxy trimethoxy silane; and in addition to the above compounds, macro monomers in which vinyl groups are polymerized that have a radical polymerizable vinyl group at the terminal thereof. These monomers may be copolymerized, alone or in combination of them, with the aforementioned (meth)acrylic acid ester.

In the acrylic pressure-sensitive adhesive tape of the present embodiment, for example, the copolymer of cyclohexyl methacrylate (CHMA) and isobutyl methacrylate (IBMA), that of cyclohexyl methacrylate (CHMA) and isobornyl methacrylate (IBXMA), that of cyclohexyl methacrylate (CHMA) and acryloyl morpholine (ACMO), and that of cyclohexyl methacrylate (CHMA) and diethylacrylamide (DEAA), are preferred as the (meth)acrylic polymer (B) in terms that an acrylic pressure-sensitive adhesive tape can be provided in which the adhesiveness to an adherend having low polarity at a low temperature is improved. As the composition ratio of the copolymer that forms the (meth)acrylic polymer (B), the content of cyclohexyl methacrylate (CHMA) is within a range of 50 to 85% by mass, and preferably within a range of 55 to 75% by mass; and that of isobutyl methacrylate (IBMA), isobornyl methacrylate (IBXMA), acryloyl morpholine (ACMO), or diethylacrylamide (DEAA) is within a range of 15 to 50% by mass, and preferably within a range of 25 to 45% by mass.

In addition, a functional group that is reactive with an epoxy group or isocyanate group may be introduced in the (meth)acrylic polymer (B). Examples of such a functional group include a hydroxyl group, carboxyl group, amino group, amide group, and mercapto group. In producing the (meth)acrylic polymer (B), it is preferable to use a monomer having such a functional group.

<Method of Adjusting Molecular Weight of (Meth)Acrylic Polymer (B)>

For the adjustment of the molecular weight of the (meth) acrylic polymer (B), a chain transfer agent can be used during the polymerization of the polymer (B). Examples of the chain transfer agent to be used include: compounds having a mercapto group, such as octyl mercaptan, dodecyl mercaptan, and t-dodecyl mercaptan, etc.; thioglycolic acid, thioglycolic acid ethyl, thioglycolic acid propyl, thioglycolic acid butyl, thioglycolic acid t-butyl, thioglycolic acid 2-ethylhexyl, thioglycolic acid octyl, thioglycolic acid decyl, thioglycolic acid dodecyl, thioglycolic acid ester of ethylene glycol, thioglycolic acid ester of neopentyl glycol, and thioglycolic acid ester of pentaerythritol. Among them, carboxyl group-containing thiols can be preferably used.

The amount of the chain transfer agent is not particularly limited, but the agent is usually contained in an amount within a range of 0.1 to 20 parts by mass, preferably in an amount within a range of 0.2 to 15 parts by mass, and more preferably in an amount within a range of 0.3 to 10 parts by mass, based on 100 parts by mass of the acrylic monomer. By adjusting the addition amount of the chain transfer agent as stated above, the (meth)acrylic polymer (B) having a preferred molecular weight can be obtained.

Various additives may be contained in the acrylic pressure-sensitive adhesive composition. Examples of such additives include, for example: cross-linking agents, such as isocyanate cross-linking agent and epoxy cross-linking agent, etc.; tackifiers, such as rosin derivative resin, polyterpene resin, petroleum resin, and oil soluble phenol resin, etc.; plasticizer; filler; anti-aging agent; and surfactants, etc.

The method of forming the pressure-sensitive adhesive layer is not particularly limited, but is formed by, for example, coating the acrylic pressure-sensitive adhesive composition on an appropriate support body, such as a separator or substrate to form a pressure-sensitive adhesive layer, and then by drying or curing the coated layer (with heat or active energy ray), if needed. In curing the coated layer with an active energy ray (light curing), a photo-polymerization reaction is inhibited by the oxygen in the air. Accordingly, it is preferable to block the oxygen by laminating an appropriate support body, such as a separator or substrate, on the pressure-sensitive adhesive layer, or by performing light curing under a nitrogen atmosphere. The appropriate support body to be used in forming the pressure-sensitive adhesive layer may be peeled off at an appropriate timing during the production of the acrylic pressure-sensitive adhesive tape or peeled off when the produced acrylic pressure-sensitive adhesive tape is used.

The thickness of the pressure-sensitive adhesive layer can be appropriately selected in accordance with the purpose of the tape or the reducing property of the adhesive force; however, the thickness is, for example, within a range of 1 to 300 μm, preferably within a range of 10 to 250 μm, and more preferably within a range of approximately 30 to 200 μm. If the thickness thereof is too small, there are sometimes cases where an adhesive force strong enough for holding an adherend cannot be obtained.

According to the acrylic pressure-sensitive adhesive tape described above, the adhesiveness to adherends having low polarity, such as polystyrene, ABS, and polycarbonate, etc., at a low temperature is improved. Herein, the "low temperature" means the temperature of approximately 5° C.

EXAMPLES

Hereinafter, the present invention will be described in detail based on Examples, but the invention should not be limited at all by these Examples.

Table 1 shows the components of the acrylic pressure-sensitive adhesive tape according to each of Examples 1 to 4 and Comparative Example 1. The pressure-sensitive adhesive layer in the acrylic pressure-sensitive adhesive tape according to each of Examples 1 to 4 and Comparative Example 1 is a single layer.

bined with a monomer mixture that was formed with 2-ethylhexyl acrylate (94 parts by mass) and acrylic acid (6 parts by mass), ultraviolet rays were radiated until the viscosity (BH viscometer, No. 5 rotor, 10 rpm, measurement temperature: 30° C.) became 15 Pa*s to obtain a partially polymerized composition (acrylic polymer syrup).

(B: Preparation of (Meth)Acrylic Polymer (CHMA/IBMA=60/40))

After cyclohexyl methacrylate (CHMA 60 parts by mass), isobutyl methacrylate (IBMA, 40 parts by mass), and thioglycolic acid (5.0 parts by mass) were combined together, nitrogen gas was blown thereinto to remove dissolved oxygen. When the mixture was heated to 90° C., Perhexyl O (made by NOF CORPORATION, 0.005 parts by mass) and Perhexyl D (made by NOF CORPORATION, 0.01 parts by mass) were mixed. Further, after the mixture was stirred at 90° C. for one hour, the mixture was heated to 150° C. for one hour and stirred at that temperature for one hour. Subsequently, the mixture was heated to 170° C. for one hour and stirred at that temperature for 60 minutes.

Subsequently, the mixture was depressurized at 170° C. and then stirred for one hour to remove the residual monomers, so that the (meth)acrylic polymer (B) was obtained. The mass average molecular weight (Mw) and the glass transition temperature (Tg) of the obtained (meth)acrylic polymer (B) were 3200 and 37° C., respectively.

Hereinafter, the method of producing the acrylic pressure-sensitive adhesive tape according to Example 1 will be described.

(Preparation of Acrylic Pressure-Sensitive Adhesive Composition)

After TMPTA (0.20 parts by mass), the (meth)acrylic polymer (B) obtained above (25 parts by mass), and IRGACURE

TABLE 1

| | ACRYLIC POLYMER (A) COMPOSITION RATIO (100 PARTS BY MASS) | (METH) ACRYLIC POLYMER (B) | | | | |
|---|---|---|---|---|---|---|
| | | COMPOSITION RATIO (100 PARTS BY MASS) | NUMBER OF PARTS (BASED ON 100 PARTS BY MASS OF ACRYLIC POLYMER (A)) | CHAIN TRANSFER AGENT (TGA) | MASS AVERAGE MOLECULAR WEIGHT (Mw) | GLASS TRANSITION TEMPERATURE (Tg) [° C.] |
| EXAMPLE 1 | 2-EHA/AA = 94/6 | CHMA/IBMA = 60/40 | 25 | 5 | 3200 | 30 |
| EXAMPLE 2 | 2-EHA/AA = 94/6 | CHMA/IBMA = 40/60 | 25 | 5 | 3000 | 21 |
| EXAMPLE 3 | 2-EHA/AA = 94/6 | CHMA/IBMA = 50/50 | 25 | 5.5 | 2600 | 36 |
| EXAMPLE 4 | 2-EHA/AA = 94/6 | CHMA/IBXMA = 70/30 | 25 | 4.5 | 3600 | 42 |
| COMPARATIVE EXAMPLE 1 | 2-EHA/AA = 94/6 | ONLY CHMA | 25 | 3.5 | 4000 | 55 |

The abbreviations in Table 1 represent the following compounds.

2EHA: 2-ethylhexyl acrylate
AA: Acrylic acid
CHMA: Cyclohexyl methacrylate
IBMA: Isobutyl methacrylate (A: Preparation of Acrylic Polymer Syrup (2-EHA/AA=94/6))

After a photo-polymerization initiator (product name of "IRGACURE 651", made by BASF, 0.07 parts by mass) and a photo-polymerization initiator (product name of "IRGACURE 184", made by BASF, 0.07 parts by mass) were com- 651 (0.05 parts by mass) were combined into the aforementioned acrylic polymer syrup 1 (100 parts by mass) to obtain an acrylic pressure-sensitive adhesive composition.

(Production of Pressure-Sensitive Adhesive Layer)

The obtained acrylic pressure-sensitive adhesive composition was coated, with a roll coater, on the surface of a polyester film (release liner made of polyester) having a thickness of 38 μm, the above surface of the polyester film being subjected to a release treatment, so that the thickness of the coating was 70 μm. Subsequently, the surface of a polyester release liner that has been subjected to a release treatment was attached to the other surface of the coated acrylic pressure-sensitive adhesive composition such that the surface that has been subjected to a release treatment faced the surface of the acrylic pressure-sensitive adhesive composition. Subsequently, ultraviolet rays were radiated, for three minutes, onto both the surfaces of the acrylic pressure-sensitive adhesive composition using black light lamps each having a lighting intensity of 5 mW/cm$^2$. Thus, an acrylic pressure-sensitive adhesive tape having a thickness of 70 μm was obtained.

Examples 2 to 4

The basic method of producing the acrylic pressure-sensitive adhesive tape according to each of Examples 2 to 4 is the same as in Example 1, except for the composition ratio of the (meth)acrylic polymer (B) and the number of parts of the thioglycolic acid that has been added. The mass average molecular weight (Mw) of the (meth)acrylic polymer (B) contained in the acrylic pressure-sensitive adhesive tape according to each of Examples 2 to 4 was such that $1500 \leq Mw \leq 4000$. The glass transition temperature (Tg) of the (meth)acrylic polymer (B) contained in the acrylic pressure-sensitive adhesive tape according to each of Examples 2 to 4 was such that $Tg \leq 45°$ C.

Comparative Example 1

The basic method of producing the acrylic pressure-sensitive adhesive tape according to Comparative Example 1 was the same as in Example 1. However, the (meth)acrylic polymer (B) contained in the pressure-sensitive adhesive tape according to Comparative Example 1 was formed only of CHMA, and the mass average molecular weight (Mw) and the glass transition temperature (Tg) were 4000 and 55° C., respectively.

(Test Method)
[90° Peeling-Off Test]

An ABS plate was prepared as the adherend having low polarity. The release liner on one side of the acrylic pressure-sensitive adhesive tape of each of Examples 1 to 4 and Comparative Example 1 was peeled off at 23° C. atmosphere. After the acrylic pressure-sensitive adhesive tape that had been backed up with an aluminum film having a thickness of 130 μm was left in 5° C. atmosphere for 30 minutes, the release film on the other side of the tape was peeled off in the same environment to expose the pressure-sensitive adhesive layer. After the pressure-sensitive adhesive tape was press-bonded to the ABS plate by one way of a 5-kg roller and then aged in the same environment for twenty minutes, the acrylic pressure-sensitive adhesive tape was peeled off in the 90° peeling-off direction at a tension speed of 300 mm/min to measure the adhesive force (unit: N/25 mm) to an ABS plate at low temperature (5° C.). The measurement results are shown in Table 2.

TABLE 2

|  | ADHESIVE FORCE TO ABS PLATE AT LOW TEMPERATURE [N/25 mm] |
|---|---|
| EXAMPLE 1 | 12.3 |
| EXAMPLE 2 | 15.2 |
| EXAMPLE 3 | 13.3 |
| EXAMPLE 4 | 16.1 |
| COMPARATIVE EXAMPLE 1 | 5.3 |

As shown in Table 2, it is known that, in the acrylic pressure-sensitive adhesive tape of each of Examples 1 to 4, the adhesive force to an ABS plate that is the adherend having low polarity is improved at a low temperature in comparison with that of the acrylic pressure-sensitive adhesive tape of Comparative Example 1.

The present invention should not be limited to the aforementioned embodiments, and various modifications, such as design modifications, can be made with respect to the above embodiments based on the knowledge of those skilled in the art, and an embodiment with such a modification can fall within the scope of the present invention.

For example, in the acrylic pressure-sensitive adhesive tape according to the aforementioned embodiments, the pressure-sensitive adhesive layer is a single layer; however, the layer may be formed by laminating a first pressure-sensitive adhesive layer on a second pressure-sensitive adhesive layer in which the components of the acrylic polymer (A) and the (meth)acrylic polymer (B) are different from those in the first pressure-sensitive adhesive layer.

What is claimed is:

1. An acrylic pressure-sensitive adhesive composition comprising:
   an acrylic polymer (A); and
   a (meth)acrylic polymer (B) having a glass transition temperature (Tg) where Tg 45° C. and a mass average molecular weight (Mw) of $1500 \leq Mw \leq 4000$.

2. The acrylic pressure-sensitive adhesive composition according to claim 1 containing a carboxyl group-containing thiol as a chain transfer agent, wherein the degree of polymerization of the (meth)acrylic polymer (B) is adjusted by the chain transfer agent.

3. An acrylic pressure-sensitive adhesive tape containing the acrylic pressure-sensitive adhesive composition according to claim 1.

4. An acrylic pressure-sensitive adhesive tape containing the acrylic pressure-sensitive adhesive composition according to claim 2.

* * * * *